(12) United States Patent
Ohshima et al.

(10) Patent No.: US 8,812,174 B2
(45) Date of Patent: Aug. 19, 2014

(54) CONTROL SYSTEM FOR VEHICLE, VEHICLE HAVING THE CONTROL SYSTEM, AND CONTROLLING METHOD THEREOF

(75) Inventors: Takeru Ohshima, Kobe (JP); Satoshi Takaya, Kakogawa (JP); Ichiro Umetani, Kakogawa (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 13/556,454

(22) Filed: Jul. 24, 2012

(65) Prior Publication Data
US 2013/0030604 A1   Jan. 31, 2013

(30) Foreign Application Priority Data
Jul. 29, 2011   (JP) ............... P2011-166378

(51) Int. Cl.
*B60W 10/00* (2006.01)
*G06F 17/00* (2006.01)

(52) U.S. Cl.
USPC ....... 701/1; 701/36; 701/54; 701/99; 180/218

(58) Field of Classification Search
USPC .................. 701/1, 36, 54, 99; 180/210, 218; 715/701
See application file for complete search history.

(56) References Cited

U.S. PATENT DOCUMENTS

| | | | | |
|---|---|---|---|---|
| 6,154,703 A * | 11/2000 | Nakai et al. | | 701/408 |
| 6,157,297 A * | 12/2000 | Nakai | | 340/461 |
| 6,157,890 A * | 12/2000 | Nakai et al. | | 701/408 |
| 6,204,752 B1 * | 3/2001 | Kishimoto | | 340/432 |
| 2002/0027031 A1 * | 3/2002 | Miyata | | 180/219 |
| 2004/0239489 A1 * | 12/2004 | Takeda | | 340/432 |
| 2005/0029031 A1 * | 2/2005 | Thomas | | 180/205 |
| 2005/0103144 A1 * | 5/2005 | Tatewaki et al. | | 74/473.3 |
| 2006/0095194 A1 * | 5/2006 | Arai et al. | | 701/96 |
| 2006/0162979 A1 * | 7/2006 | Usukura et al. | | 180/230 |
| 2007/0235315 A1 * | 10/2007 | Tozuka et al. | | 200/571 |
| 2007/0276549 A1 * | 11/2007 | Hijikata | | 701/1 |
| 2008/0015767 A1 * | 1/2008 | Masuda et al. | | 701/99 |
| 2008/0015768 A1 * | 1/2008 | Masuda et al. | | 701/99 |
| 2008/0115761 A1 * | 5/2008 | Deguchi et al. | | 123/336 |
| 2008/0215217 A1 * | 9/2008 | Unno | | 701/54 |
| 2008/0287256 A1 * | 11/2008 | Unno | | 477/115 |
| 2010/0059018 A1 * | 3/2010 | Akatsuka | | 123/399 |
| 2010/0211254 A1 * | 8/2010 | Kimura et al. | | 701/29 |
| 2010/0250049 A1 * | 9/2010 | Nihei et al. | | 701/29 |
| 2010/0270135 A1 * | 10/2010 | Murasawa et al. | | 200/61.88 |
| 2011/0040434 A1 * | 2/2011 | Kishibata | | 701/22 |
| 2011/0205039 A1 * | 8/2011 | Tsuyuguchi et al. | | 340/425.5 |

FOREIGN PATENT DOCUMENTS

JP   2004-196297   7/2004

* cited by examiner

*Primary Examiner* — Calvin Cheung
*Assistant Examiner* — Courtney Heinle
(74) *Attorney, Agent, or Firm* — Wenderoth, Lind & Ponack, L.L.P.

(57) ABSTRACT

A controller system for vehicle which has a plurality of driving modes which influence driving feeling, and performs selection from the driving modes and the regulation by inputs from a selecting switch, a forwardسsequence regulating switch, and a reverse sequence regulating switch. For each input from the selecting switch, changing to the driving mode according to a predetermined normal order. For each input from each of the regulating switches, the current controlled step is changed in a predetermined tendency direction. In a state where the controlled step reaches a final step, the state of the final step is maintained even when the same regulating signal is inputted.

18 Claims, 9 Drawing Sheets

(a)

(b)

(c)

CONTROL SYSTEM FOR VEHICLE, VEHICLE HAVING THE CONTROL SYSTEM, AND CONTROLLING METHOD THEREOF

BACKGROUND OF THE INVENTION

1. Field of the Invention

The present invention relates to a control system for vehicle, a vehicle, and a controlling method thereof, in which selection from a plurality of driving modes which influence driving feeling is performed by a selecting switch and a plurality of controlled steps in the driving mode are then changed in a predetermined normal order or a reverse order thereof by a forward sequence regulating switch and a reverse sequence regulating switch, so that the selection of the driving mode and the regulation of the controlled steps in the driving mode are performed.

2. Description of the Prior Art

A vehicle has a plurality of driving modes in which controlled steps can be regulated by the switch operation of the driver. Among those driving modes, the driving modes which influence driving feeling are an engine output mode, a traction control performance mode, and a limiting speed mode. In addition, the driving modes irrelevant to the engine are an Anti Lock Brake System (ABS) mode, an electronic suspension mode, and a windshield mode. Conventionally, exclusive switches are provided in the driving modes, respectively, in order to change the driving modes to the desired controlled steps (Japanese Patent Application Laid-Open (JP-A) No. 2004-196297).

However, the number of exclusive switches disposed according to the increase of the number of the driving modes is too large, with the result that the number of components for switches is increased to require a large switches arranging space. Besides, during driving, it takes time for the rider to look for the switch in the driving mode to be regulated. In particular, in a motorcycle having a handlebar, the number of switches is too large, and the switches are required to be arranged away from the grip, thereby making the switch operation during driving difficult.

SUMMARY OF THE INVENTION

An object of the present invention is to provide a control system, a vehicle, and a controlling method thereof, which can prevent the increase of the number of switches for operation with respect to the increase of the number of driving modes to be regulated and can regulate each controlled step to a state according to the intention of the driver.

To solve the above problems, a control system for vehicle according to the present invention has a selecting switch which has a plurality of driving modes which influence driving feeling and can select the desired driving mode from the plurality of driving modes during driving, a forward sequence regulating switch which changes a plurality of controlled steps in the driving mode selected by the selecting switch according to a predetermined normal order, and a reverse sequence regulating switch which changes the plurality of controlled steps in a reverse order of the predetermined normal order, the selection of the driving mode and the regulation of each of the controlled steps in the driving mode being performed based on signals inputted from the selecting switch, the forward sequence regulating switch, and the reverse sequence regulating switch, wherein the selecting switch performs changing to the driving mode to be regulated according to the predetermined normal order each time a selection signal from the selecting switch is inputted, wherein the forward sequence regulating switch changes the current controlled step in the predetermined normal order each time a forward sequence regulating signal from the forward sequence regulating switch is inputted and, in a state where a forward sequence final step is reached, maintains the forward sequence final step even when the forward sequence regulating signal from the forward sequence regulating switch is inputted, wherein the reverse sequence regulating switch changes the current controlled step in a reverse order of the predetermined normal order each time a reverse sequence regulating signal from the reverse sequence regulating switch is inputted and, in a state where a reverse sequence final step is reached, maintains the reverse sequence final step even when the reverse sequence regulating signal from the reverse sequence regulating switch is inputted. The controlled steps include various steps of, in addition to the increase and decrease of a control amount which will be described next, the strength of a control force, ON/OFF, the height of a frequency, and a step in which a plurality of states are simply arranged in the order of 1 to 5 or A to D. In the steps, two steps like ON/OFF can be set, but three steps or more are preferably set.

In addition to the above configuration, the control system for vehicle according to the present invention can have the following features.

(a) The predetermined normal order is an order in which the control amount corresponding to each of the controlled steps is sequentially increased, the reverse order is an order in which the control amount corresponding to each of the controlled steps is sequentially decreased, the forward sequence regulating switch is a switch which sequentially performs changing to a control amount increase side, and the reverse sequence regulating switch is a switch which sequentially performs changing to a control amount decrease side.

(b) At least one of the selected driving mode and the regulated step is displayed in a display section for mode confirmation according to the operation of the selecting switch or each of the regulating switches corresponding thereto.

(c) In an initial normal state in which the selection signal from the selecting switch is not inputted, each controlled step in modes other than the driving modes is changed according to the regulating signal inputted from each of the regulating switches.

(d) In a state where the driving mode to be regulated is selected, when the signal from the selecting switch or each of the regulating switches is not inputted for a fixed time, the regulating signal from the regulating switch is invalid until another selection signal from the selecting switch is inputted.

(e) In a state where the driving mode to be regulated is selected, when the signal from the selecting switch or each of the regulating switches is not inputted for a fixed time, the finally operated controlled step is maintained to return to a state where the selection signal from the selecting switch is not inputted.

(f) The selecting switch can perform selection from modes other than the driving modes, and each of the regulating switches can change a plurality of controlled steps in the modes other than the driving modes, which are selected by the selecting switch. The modes other than the driving modes are the volume of a speaker, the display of an accessory, and ON/OFF of wireless communication.

(g) The control system is mounted on a vehicle having a handlebar. The selecting switch and the regulating switches are arranged near a grip of the handlebar. Besides, the selecting switch and the regulating switches are provided to be separated from switches which control devices which generate light for illumination and sound for notification to the outside of the vehicle.

(h) The driving modes which influence driving feeling include the output control of the driving force of the vehicle.

(i) The driving modes which influence driving feeling are control modes of actuators which are different from actuators for the output control of the vehicle.

In addition, the present invention provides a vehicle having the control system for vehicle according to the present invention, and also provides the following controlling method.

A controlling method for vehicle has a selecting switch which has a plurality of driving modes which influence driving feeling and can select the desired driving mode from the plurality of driving modes during driving, a forward sequence regulating switch which changes a plurality of controlled steps in the driving mode selected by the selecting switch according to a predetermined normal order, and a reverse sequence regulating switch which changes the plurality of controlled steps in a reverse order of the predetermined normal order, the selection of the driving mode and the regulation of each of the controlled steps in the driving mode being performed based on signals inputted from the selecting switch, the forward sequence regulating switch, and the reverse sequence regulating switch, wherein the selecting switch performs changing to the driving mode to be regulated according to the predetermined normal order each time a selection signal from the selecting switch is inputted, wherein the forward sequence regulating switch changes the current controlled step in the predetermined normal order each time a forward sequence regulating signal from the forward sequence regulating switch is inputted and, in a state where a forward sequence final step is reached, maintains the forward sequence final step even when the forward sequence regulating signal from the forward sequence regulating switch is inputted, wherein the reverse sequence regulating switch changes the current controlled step in a reverse order of the predetermined normal order each time a reverse sequence regulating signal from the reverse sequence regulating switch is inputted and, in a state where a reverse sequence final step is reached, maintains the reverse sequence final step even when the reverse sequence regulating signal from the reverse sequence regulating switch is inputted.

(1) According to the present invention, the selecting switch performs changing to the driving mode to be regulated, and then, each of the regulating switches regulates each of the controlled steps in the selected driving mode to be regulated. Therefore, each of the regulating switches can be shared among the plurality of driving modes. Thereby, it is unnecessary to provide each of the regulating switches in each of the driving modes, the number of components for switches can be reduced, and the switches arranging space can be compact.

(2) During driving, when the forward sequence regulating signal from the forward sequence regulating switch is continuously inputted and the reverse sequence regulating signal from the reverse sequence regulating switch is continuously inputted, each of the controlled steps is maintained at each of the final steps. Therefore, during driving, each of the controlled steps can be always changed according to the intention of the driver. That is, each of the controlled steps can be prevented from being suddenly changed to the regulated side against the intention of the driver. With this, driving feeling can be held good.

(3) For the regulation of each of the controlled steps, the forward sequence regulating switch and the reverse sequence regulating switch are separately provided. Therefore, the driver can regulate each of the controlled steps along his/her intension without noting the meter screen.

(4) According to the configuration (a), the controlled step to be regulated includes a control amount, the control amount is changed to the control amount increase side by the forward sequence regulating switch, and the control amount is changed to the control amount decrease side by the reverse sequence regulating switch. With this, when during driving, the regulating signal is continuously inputted to the increase side from the forward sequence regulating switch or the regulating signal is continuously inputted to the decrease side from the reverse sequence regulating switch, the control amount is maintained at a maximum value or a minimum value. Therefore, during driving, the control amount can be prevented from being changed to the tendency side against the intention of the driver.

(5) According to the configuration (b), the driving mode or the controlled step (control amount) to be regulated are displayed in the display section for driving state confirmation of the meter, with the switch operation. Therefore, the driving mode or the controlled step (control amount) can be regulated with confirmation.

(6) According to the configuration (c), in the initial normal state in which the selection signal from the selecting switch is not inputted, even when each of the regulating switches is operated, the driving mode is not changed. Therefore, any false operations can be prevented. In addition, the number of components can be reduced.

(7) According to the configuration (d), when a state where the driving mode is selected is left for a fixed time, the selecting mode is automatically ended without inputting a selection ending instruction. With this, the pressing of the selecting switch can be prevented from being forgotten. Therefore, the driving state can be prevented from being undesirably changed.

(8) According to the configuration (e), when a state where the driving mode is selected is left for a fixed time, the finally operated controlled step is maintained without inputting the selection ending instruction to return to a state where the selection signal from the selecting switch is not inputted. With this, the pressing of the selecting switch can be prevented from being forgotten. Therefore, the driving state can be prevented from being undesirably changed.

(9) According to the configuration (f), the selecting switch can perform selection from modes other than the driving modes. Therefore, the use of the selecting switch is increased.

(10) According to the configuration (g), in the vehicle having a handlebar like a motorcycle, the driver can operate the selecting switch and the regulating switches in the state he/she grips the grip. Therefore, the switch operation during driving is easy. In addition, the selecting switch and the regulating switches are arranged to be separated from the switches which generate light or sound for illumination or notification. Therefore, the switch operation can be easily performed.

(11) According to the configuration (h), the output control of the driving force is selected and regulated by using the selecting switch and the regulating switches. Therefore, the output control is easy. The output control of the driving force is performed by operating a throttle and a fuel injection valve to regulate a fuel injection amount and an intake amount mainly. The modes thereof include the change of a power level (full power and low power), and the change between an eco-mode and a normal mode. In addition, the change of a fuel supply map or an electronic throttle control characteristic can be performed for control.

(12) According to the configuration (i), the control modes of the actuators, such as an ABS, a windshield, a grip heater, an electronically controlled suspension, and a steering damper, which are different from the actuators for output control, such as a fuel injector, an electronic throttle, and an ignition device, can be easily controlled.

(13) In the handlebar type vehicle having the control system according to the present invention, it is unnecessary to increase the number of switches in the limited arranging space while the number of control functions is increased.

(14) The controlling method according to the present invention has the same effects as (1), (2), and (3).

BRIEF DESCRIPTION OF THE DRAWINGS

The above and other objects, features and advantages of the present invention will be become more apparent from the following description taken in connection with the accompanying drawings, in which.

DETAILED DESCRIPTION OF THE PREFERRED EMBODIMENTS

The Configuration of a Motorcycle

Figure 1:
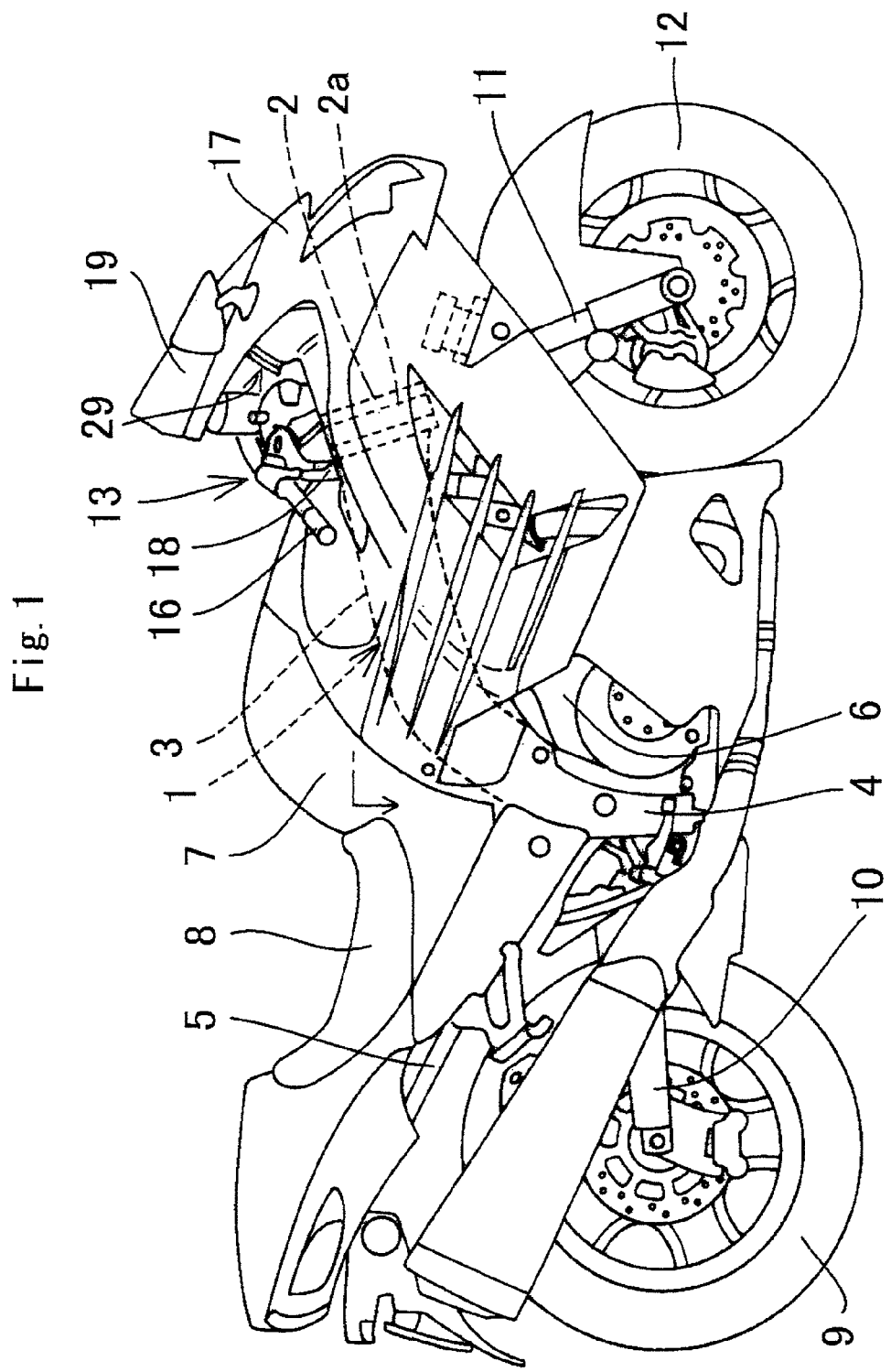
FIG. 1 is a right side view of a motorcycle having a control system according to the present invention.
Figure 2:
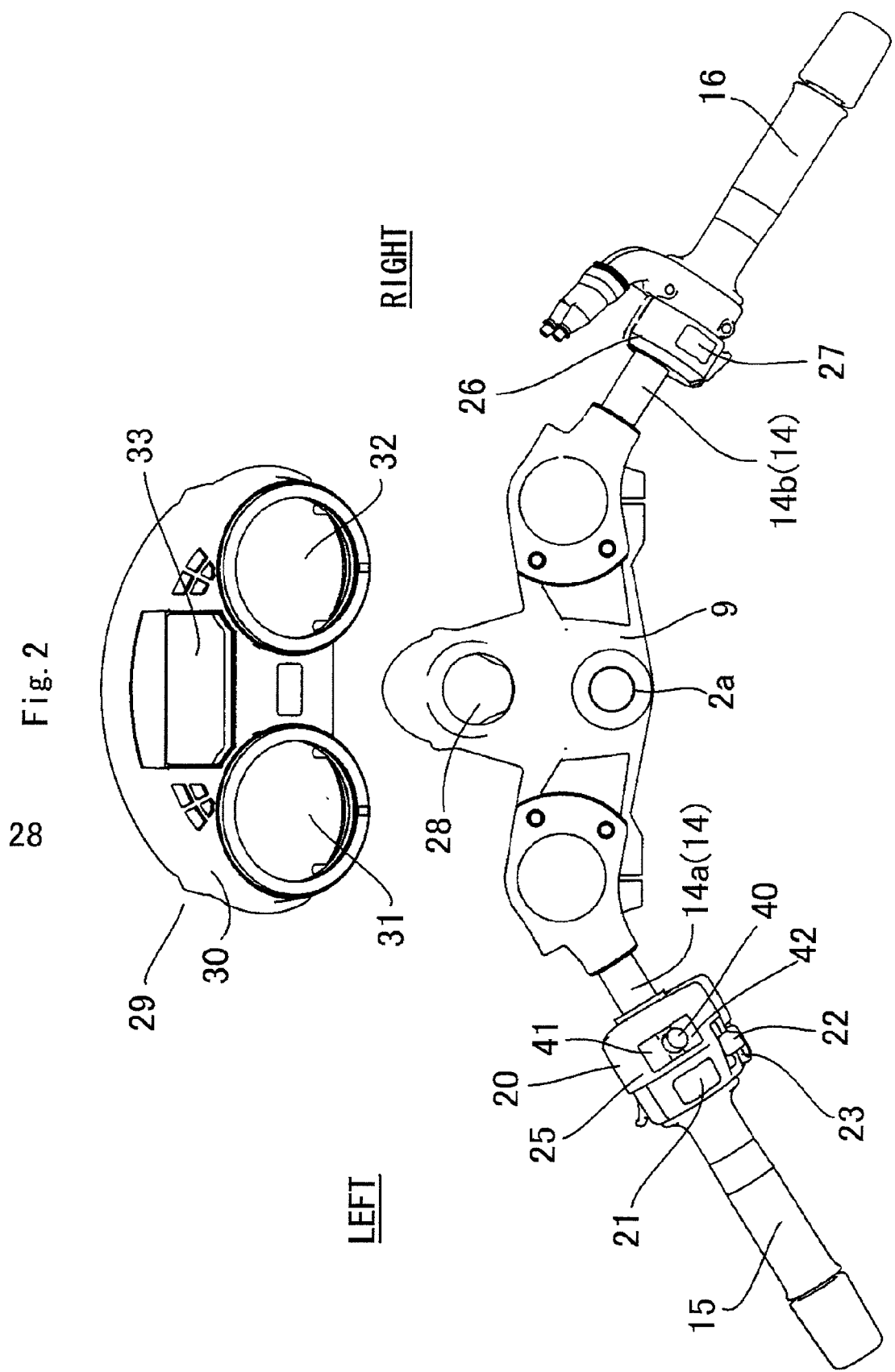
FIG. 2 is a plan view of a steering device and a meter unit of the motorcycle of FIG. 1.
Figure 3:
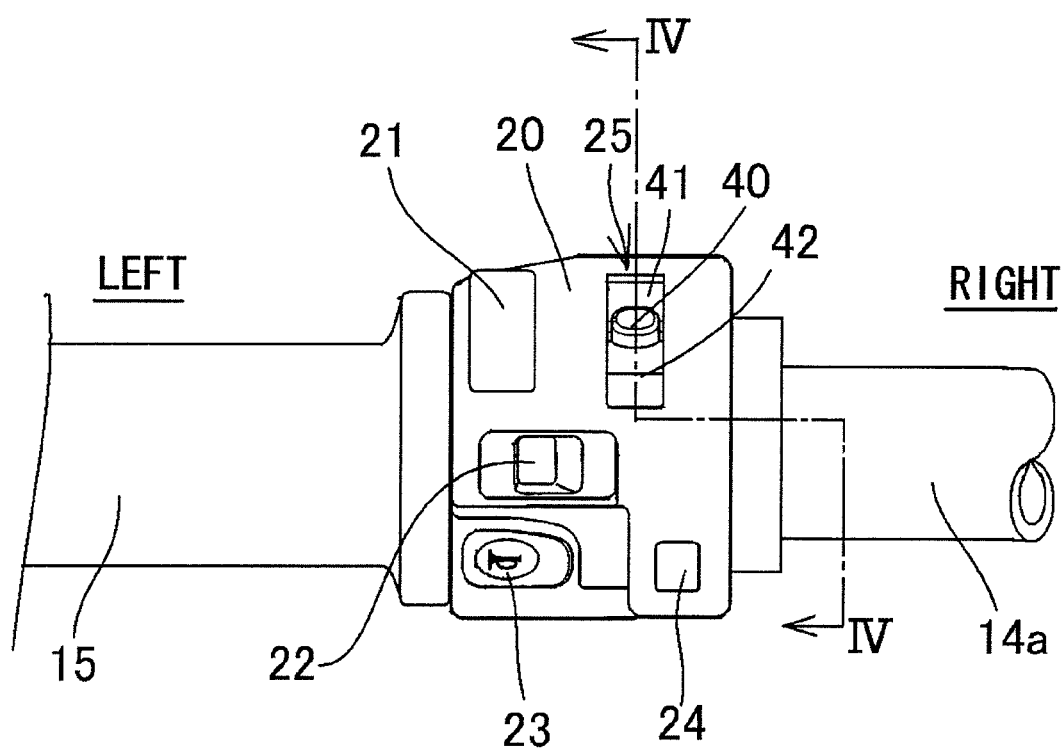
FIG. 3 is a rear view near a left grip of the steering device of FIG. 2.

FIG. 1 is a right side view of a motorcycle having a control system according to the present invention, FIG. 2 is a plan view of a steering device and a meter unit, and FIG. 3 is a rear view near a left grip portion. In FIG. 1, a body frame 1 has a head pipe 2 at the front end thereof, and a main frame 3 which is branched to the right and left from the head pipe 2 and extends rearward. At the rear end of the main frame 3, a swing arm bracket 4 which extends downward is integrally formed, and a rear frame 5 which extends rearward is fixed. A handlebar type steering device 13 is arranged above the head pipe 2. An engine 6 is mounted below the main frame 3. A fuel tank 7 is arranged above the main frame 3. A seat 8 is arranged above the rear frame 5.

A pair of left and right front forks 11 are supported by the head pipe 2 via a steering shaft 2a and a pair of upper and lower brackets (only an upper bracket 9 is shown in FIG. 2). A front wheel 12 is supported at the lower ends of the front forks 11. A swing arm 10 which extends rearward is supported by the swing arm bracket 4 so as to be swingable up and down. A rear wheel 9 is supported at the rear end of the swing arm 10. A front cowl 17 is provided in front of the head pipe 2. A windshield 19 which can be adjusted in a height or an angle is provided on the front cowl 17.

In FIG. 2, a handlebar 14 of the steering device 13 has a left handlebar portion 14a which is fixed to the left end of the upper bracket 9, and a right handlebar portion 14b which is fixed to the right end of the upper bracket 9. A left grip 15 is provided in the left handlebar portion 14a. A throttle right grip 16 is provided in the right handlebar portion 14b. A main switch 28 is provided at the center in the left-right direction of the upper bracket 9. A clutch lever (not shown) is attached to the left handlebar portion 14a. A brake lever 18 (FIG. 1) is attached to the right handlebar portion 14b.

Figure 7:
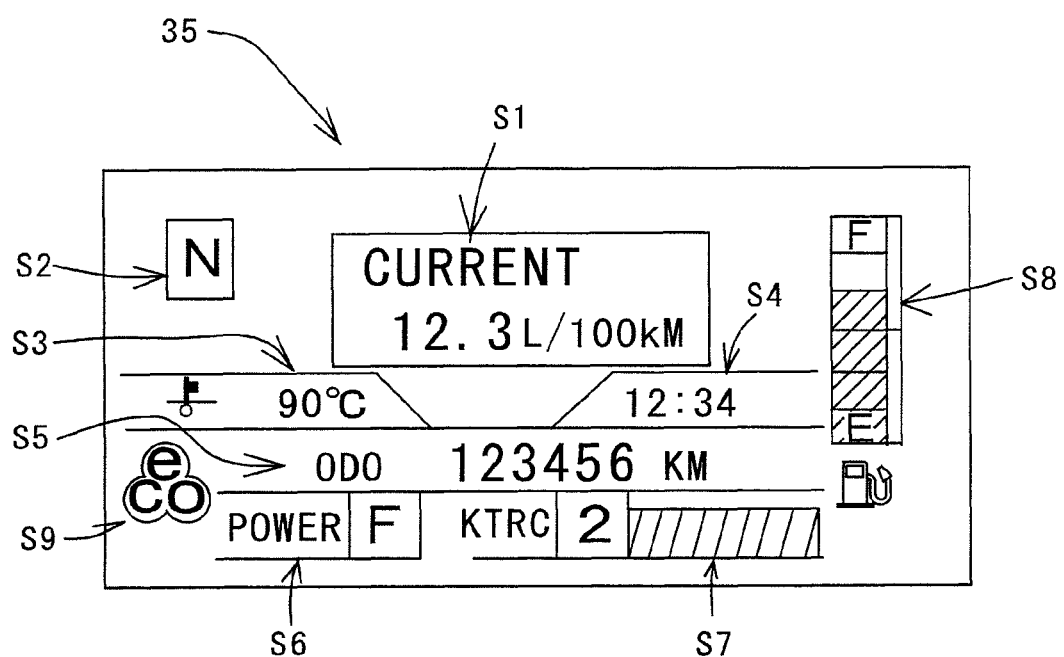
FIG. 7 is a plan view of a panel display section of the meter unit.

A meter unit 29 is arranged in front of the upper bracket 9. The meter unit 29 has a meter bracket 30 which is supported by the head pipe 2. A speed meter attaching hole 31, a tachometer attaching hole 32, and a panel display section attaching hole 33 are formed in the meter bracket 30. A speed meter (not shown) is attached into the speed meter attaching hole 31. A tachometer is attached into the tachometer attaching hole 32. A panel display section 35 as shown in FIG. 7 is attached into the panel display section attaching hole 33.

In FIG. 3, a left switch attaching member 20 is fixed to the left handlebar portion 14a in the right side position of the left grip 15. A head lamp height changing switch 21, a blinker switch 22, and a horn switch 23 are arranged in the left half region of the left switch attaching member 20 in this order from the upper side. A 3 channel switch mechanism 25 according to the present invention is arranged in the upper portion of the right half region of the left switch attaching member 20. A hazard switch 24 is arranged in the lower portion of the right half region of the left switch attaching member 20.

In FIG. 2, a right switch attaching member 26 is fixed into the left position of the throttle right grip 16 in the right handlebar portion 14b. Various switches 27 other than the above switches are provided on the right switch attaching member 26.

[The Configuration of the 3 Channel Switch Mechanism 25]

Figure 4:
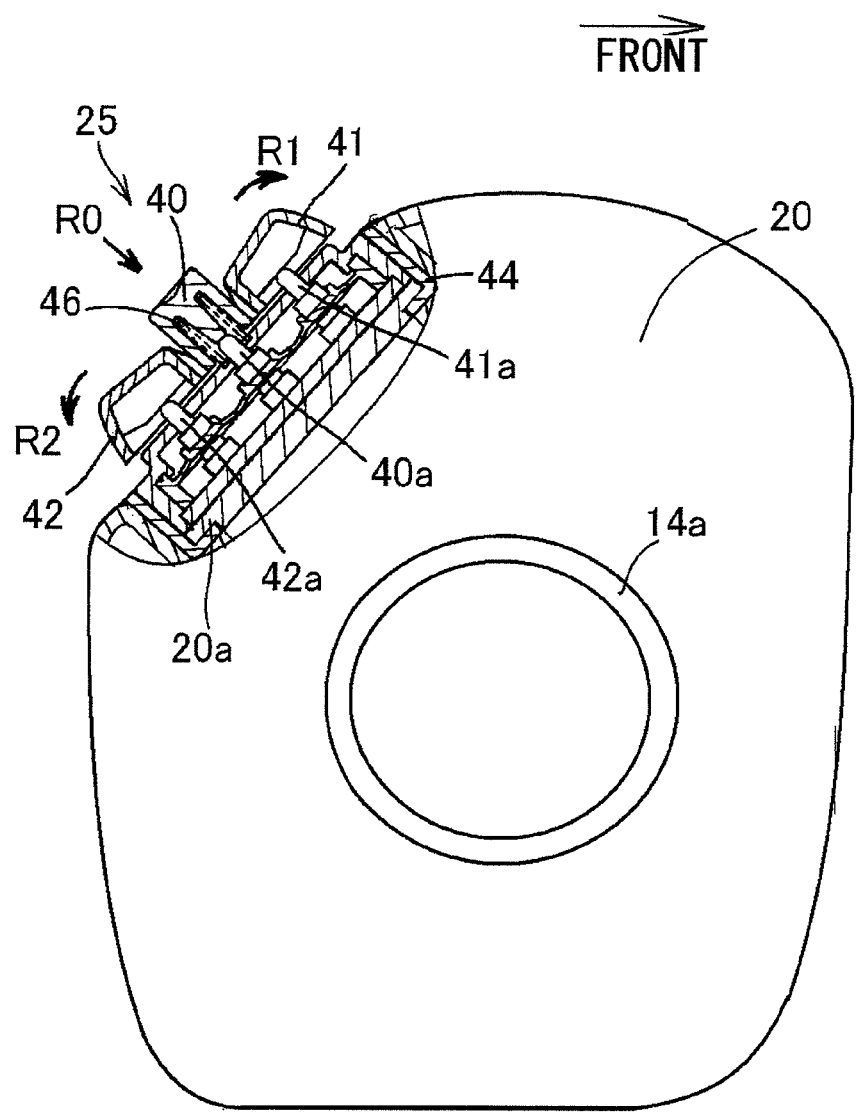
FIG. 4 is a cross-sectional view taken along line IV-IV of FIG. 3.

FIG. 4 is a cross-sectional view taken along line IV-IV of FIG. 3. The 3 channel switch mechanism 25 has a pressing button type selecting switch 40, and a forward sequence regulating switch 41 and a reverse sequence regulating switch 42 which are arranged so as to sandwich the selecting switch 40 from the upper and lower sides.

The selecting switch 40 is a switch which performs selection from a plurality of driving modes which influence driving feeling. The forward sequence regulating switch 41 is a regulating switch which changes a plurality of controlled steps in the driving mode selected by the selecting switch 40 according to a predetermined normal order. The reverse sequence regulating switch 42 is a regulating switch which changes the plurality of controlled steps in a reverse order of the predetermined normal order.

The selecting switch 40, the forward sequence regulating switch 41, and the reverse sequence regulating switch 42 are supported in a shared switch housing 44. The forward sequence regulating switch 41 is arranged on the upper side of the selecting switch 40. The reverse sequence regulating switch 42 is arranged on the lower side of the selecting switch 40. In the embodiment, an upper portion attaching surface 20a of the left switch attaching member 20 to which the 3 channel switch mechanism 25 is attached is an inclined surface which is inclined downward rearward. Therefore, to be exact, the forward sequence regulating switch 41 is arranged in the front upper position with respect to the selecting switch 40. In addition, the reverse sequence regulating switch 42 is arranged in the rear lower position with respect to the selecting switch 40.

The forward sequence regulating switch 41 and the reverse sequence regulating switch 42 are seesaw type switches which are integrally coupled to each other. The forward sequence regulating switch 41 and the reverse sequence regulating switch 42 which are seesaw type switches are rotatably supported in the switch housing 44 via a rotating support shaft (not shown). Therefore, when the forward sequence regulating switch 41 is pressed in the direction indicated by arrow R1, the reverse sequence regulating switch 42 is lifted in the opposite direction of the direction indicated by arrow R2. On the contrary, when the reverse sequence regulating switch 42 is pressed in the direction indicated by arrow R2, the forward sequence regulating switch 41 is lifted in the opposite direction of the direction indicated by arrow R1.

The selecting switch 40 is biased by a coil spring 46 to the OFF position side (the side in the opposite direction of the direction indicated by arrow R0). The selecting switch 40, the forward sequence regulating switch 41, and the reverse sequence regulating switch 42 are abutted onto moving pins 40a, 41a, and 42a which are arranged in the switch housing 44, respectively. The moving pins 40a, 41a, and 42a are biased to the selecting switch 40, the forward sequence regulating switch 41, and the reverse sequence regulating switch 42 by the spring member, respectively. The selecting switch 40 is pressed against the coil spring 46, so that the moving pin 40a for the selecting switch is pressed to connect a contact for selection, thereby transmitting a selection signal. The forward sequence regulating switch 41 is pressed, so that the moving pin 41a for the forward sequence regulating switch is pressed to connect a contact for forward sequence regulation, thereby transmitting a forward sequence regulating signal. The reverse sequence regulating switch 42 is pressed, so that the moving pin 42a for the reverse sequence regulating switch is pressed to connect a contact for reverse sequence regulation, thereby transmitting a reverse sequence regulating signal.

In addition, in the embodiment, the selecting switch 40, the forward sequence regulating switch 41, and the reverse sequence regulating switch 42 enable a short pressing operation which releases a pressed state within a predetermined time (e.g., about 3 to 4 seconds), and a long pressing operation which holds the pressed state up to the predetermined time. The alternate use of the long pressing operation and the short pressing operation will be described in the section of the controlled contents of the 3 channel switch mechanism 25, which will be described later. The forward sequence regulating switch 41 and the reverse sequence regulating switch 42 are pressed at the same time, which is determined as a cancelled state. The canceled state is the same as a state where any of the regulating switches 41 and 42 is not pressed.

Figure 5:
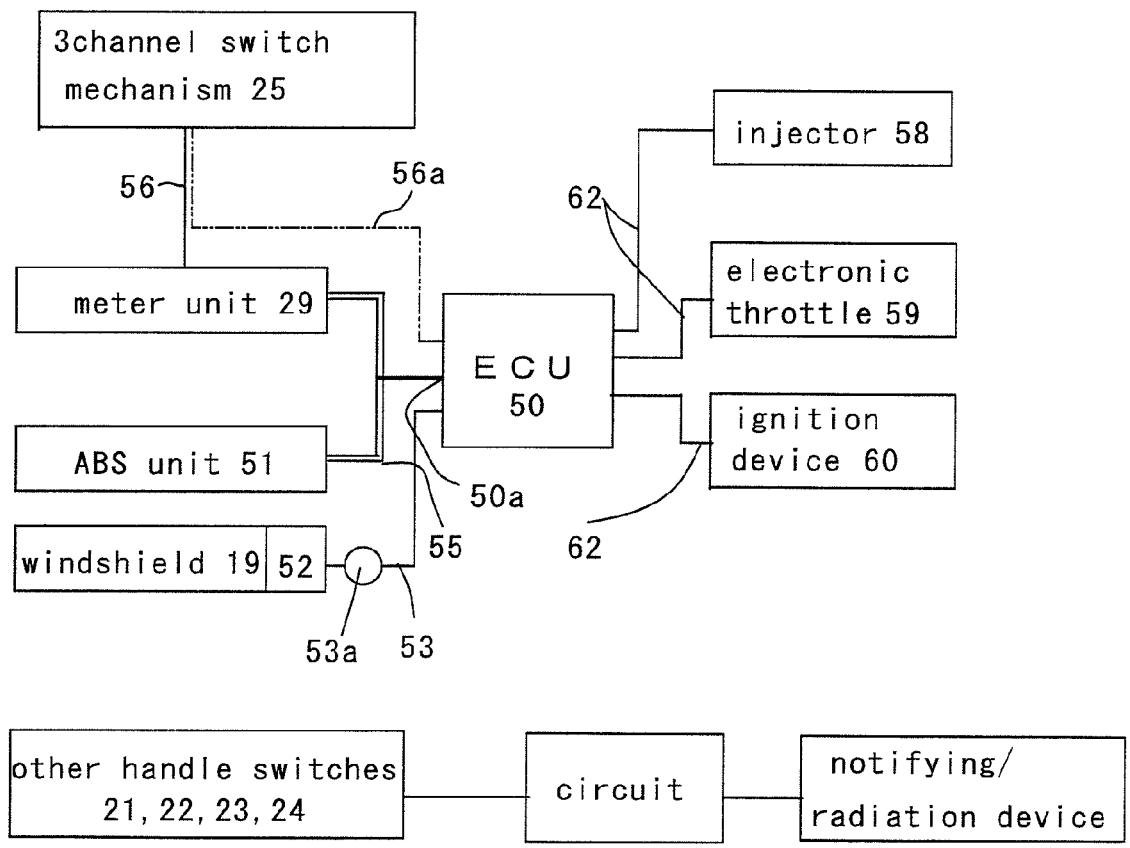
FIG. 5 is a block diagram showing control system wiring.

FIG. 5 is a block diagram showing electric wiring between an ECU (engine control unit) 50 mounted on a vehicle and actuators and operation sections to be controlled of the vehicle. One input/output connection port 50a of the ECU 50, the meter unit 29, and an ABS unit 51 are connected by a CAN communication line (CANH line and CANL line) 55. With this, a CAN communication system (Control Area Network Communication System) having a multiplex communication function is built. On the other hand, an injector for fuel injection 58, an electronic throttle 59, and an ignition device 60 are connected, as actuators for engine control, to a different input/output connection port of the ECU 50 by typical serial communication electric wiring 62. In addition, an up/down operation section 52 of the windshield 19 is connected to the input section of the ECU 50 via a relay circuit 53a and a signal line 53. Further, other steering switches (21, 22, 23, and 24) are connected to a notifying device such as a horn and/or an illuminating device such as a blinker via a circuit.

As indicated by an imaginary line (56a), the 3 channel switch mechanism 25 can also be directly connected to the connection port of the ECU 50. However, in this embodiment, the 3 channel switch mechanism 25 is connected to the meter unit 29 by a typical signal line (serial communication electric wiring) 56. Therefore, the selection signal, an increasing signal, and a decreasing signal from the 3 channel switch mechanism 25 are transmitted to the ECU 50 via the meter unit 29 and the CAN communication line 55. The 3 channel switch mechanism 25 is directly connected to the meter unit 29, so that the control of the meter unit 29 itself (the changing of the display screen) can also be directly performed by using the communication with the control section in the meter unit 29, not via the ECU 50. Other switches can be connected, not via the ECU 50.

In short, in this embodiment, the 3 channel switch mechanism 25 is connected to the meter unit 29 which is electric equipment for vehicle and is arranged near the switch mechanism so as to be capable of transmitting a signal, and the meter unit 29 is connected to the ECU (control system body) 50 so as to be capable of transmitting a signal. The signal line which connects the meter unit 29 and the ECU 50 connects the ECU 50 and a plurality of pieces of electric equipment for vehicle through the bus. The plurality of pieces of electric equipment for vehicle share one communication path to transmit and receive a signal. That is, as described above, the meter unit 29 transmits and receives a signal to and from the ECU 50 by the CAN communication.

The meter unit 29 determines the operation instruction of the driver based on the electric change, e.g., the voltage change, in the signal line 56 connected to the 3 channel switch mechanism 25. The meter unit 29 converts a signal which indicates the operation instruction of the driver by the 3 channel switch mechanism 25 so as to enable the CAN communication transmission, and transmits the converted signal to the ECU 50. The 3 channel switch mechanism 25 transmits the operation instruction of the driver to the ECU 50 via the CAN communication line 55 which connects the meter unit 29 and the ECU 50. Therefore, as compared with when the 3 channel switch mechanism 25 and the ECU 50 are directly connected, the length and the number of the signal lines can be reduced.

In addition to the meter unit 29 and the ABS unit 51, the plurality of pieces of electric equipment for vehicle connected by the CAN communication are assumed to be an electronically controlled suspension control unit, a stealing prevention unit such as an immobilizer, and an AFS unit.

[The Configuration of the Panel Display Section 35]

FIG. 7 shows an example of the panel display section 35. The panel display section 35 computes information to be displayed in the meter unit 29 based on information from the control section in the ECU 50 or the meter unit 29, and displays the computed information. The panel display section 35 displays first, second and third informations. The first information shows driving mode states which can be regulated by the operation of the driver. The second information shows information which is irrelevant to the driving modes, and the display of the information can be changed by the operation of the driver. The third information is other than the first and second information. The first information includes an outputted step, traction control, and an eco-mode. The second information includes a fuel consumption or gas mileage, a travelable distance, a battery voltage, an outside temperature, and two kinds of total travel distances or mileages. The third information includes water temperature, a gear ratio, a remaining fuel amount, error information, and a clock.

An example of divided display regions will be described. A first display region S1 in the upper section displays, an instant fuel consumption, among various fuel consumptions. A second display region S2 in the upper section displays a gear shift stage. A third display region S3 in the middle section displays water temperature. A fourth display region S4 in the middle section displays the current time. A fifth display region S5 in the middle section displays, a total travel distance, among various travel distances. A sixth display region S6 in the lower section displays a set outputted step. A seventh display region S7 in the lower section displays a control value about traction control. Further, an eighth display region S8 in the right end position displays a remaining fuel amount. A ninth display region S9 in the left end position in the lower section displays the "eco-mode" which shows that the engine is controlled according to the output characteristic in which priority is given to the fuel consumption.

In the embodiment, of the display regions in the upper section, the displayed contents of the first display region S1 can be changed by the 3 channel switch mechanism 25. For instance, display change to any one of the instant fuel consumption, the average fuel consumption, the travelable distance, the battery voltage, and the outside temperature is enabled by the operation of the driver. This changing operation is enabled during driving.

In the sixth display region S6 in the lower section which displays the outputted step, any one of display symbol "F" indicating a full power state which does not limit the engine output and display symbol "L" indicating a low power state which limits the engine output is displayed or reflected corresponding to the changing of the power state. That is, display symbol "F" is displayed or reflected in the full power state, and display symbol "L" is displayed or reflected in the low power state. The sixth display region S6 is the display section for driving mode confirmation.

In the seventh display region S7 in the lower section which displays the traction control performance, any one of the numerical values and the symbol of "OFF, 1, 2, and 3" which indicate the height of the traction control performance is displayed or reflected by the 3 channel switch mechanism 25 corresponding to the changing of the traction control performance. Further, on the right side of the box which indicates the numerical values and the symbol of "OFF, 1, 2, and 3", the strength of the actual traction workability is reflected according to the increase and decrease of the number of segments. The strength of the workability refers to an output suppression amount during driving. The output suppression amount is displayed in real time. The segment amount displayed is increased as the suppression amount is larger. The seventh display region S7 is also the display section for driving mode confirmation.

The height steps of the traction control performance of "OFF, 1, 2, and 3" are set, respectively, according to the value of the idling amount on the driving wheel (rear wheel) side when the traction control starts to work, e.g., the combination of the speed difference between the front wheel and the rear wheel and the output suppression value when the traction control works.

For instance, at "OFF" step, the traction control is released. At "OFF" step, no matter how the idling of the driving wheel (rear wheel) is increased, the idling is not prevented. First step "1" is a step set so that the traction control starts to work by a large idling amount and the output control is the smallest. That is, first step "1" is a step in which the traction control is hard to work and the output control is the smallest. As first step "1" is changed to second step "2" and third step "3", the traction control works more easily and the output control is larger.

The displayed contents and regulated contents are summarized as follows, although there can be overlapped description thereof.

For the regulation of the outputted step, the full power does not limit the maximum output, and the low power limits the maximum output according to state so as not to provide excessive output. As described above, at the time of setting the full power, "F" is displayed, and at the time of setting the low power, "L" is displayed. Then, the order in which the small output state is changed to the large output state is set as the "predetermined normal order". Therefore, when the forward sequence regulating switch 41 is short pressed, the outputted step is changed to the full power, and when the reverse sequence regulating switch 42 is short pressed, the outputted step is changed to the low power.

The traction control in which the slip prevention control is not performed is "OFF". The traction control in which the slip prevention control is performed is divided into three steps of 1 to 3 according to the prevention degree thereof. Values "1, 2, and 3" are set in the order in which the small prevention degree is changed to the large prevention degree. That is, value "3" indicates a state where the prevention degree is the largest. For the prevention degree, a slip amount which starts the slip prevention, a prevention rate according to the slip amount, and a prevention period may be totally set. The display is changed according to step.

For instance, step (1) in which the slip prevention is started when the slip amount exceeds a first set value, step (2) in which the slip prevention is started when the slip amount exceeds a second set value which is smaller than the first set value, and step (3) in which the slip prevention is started when the slip amount exceeds a third set value which is smaller than the second set value may be set. In addition, the prevention amount in the noted slip amount may be set to small step (1), intermediate step (2), and large step (3).

For the eco-mode, a non-eco-mode is a state where there is no limit, and the eco-mode controls the engine according to the output characteristic in which priority is given to the fuel consumption, delays output change with respect to accelerator grip change, and reduces output torque at a constant speed. Then, the display is changed at the time of setting the non-eco-mode and at the time of the eco-mode.

[The Controlled Contents by the Operation of the 3 Channel Switch Mechanism 25]

Figure 6:
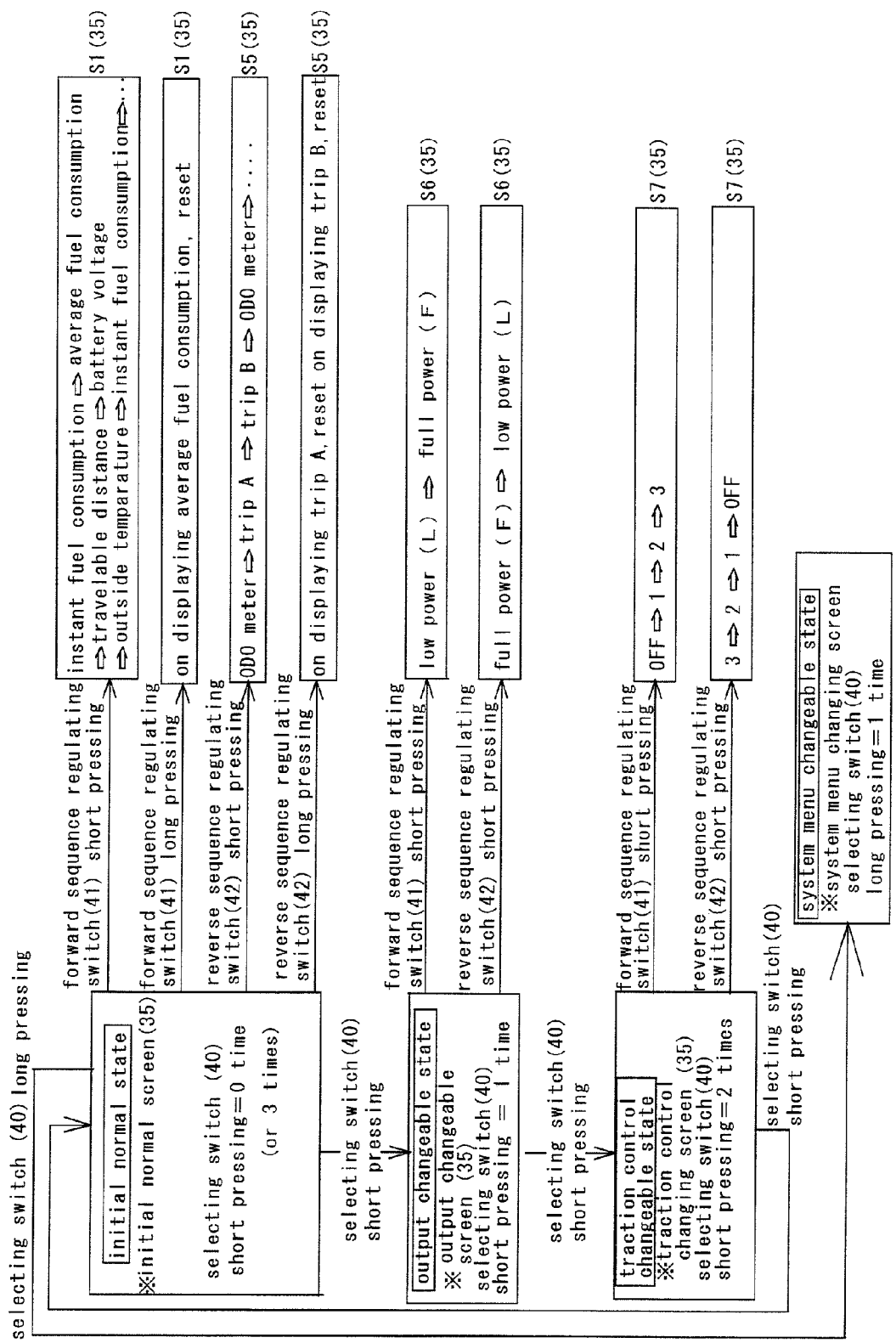
FIG. 6 is a block diagram showing the control flow of a controlling method according to the present invention.

FIG. 6 shows an example of the operation of the 3 channel switch mechanism 25 and the control thereby. For the driving modes which can be selected by the selecting switch 40, an initial normal state shown at the first stage, an output changeable state shown at the second stage, and a traction control changeable state shown at the third stage can be sequentially changed according to the order. The output changeable state at the second stage and the traction control changeable state at the third stage are a state where the driving modes which influence driving feeling can be regulated. The initial normal state is a state where modes which do not influence driving feeling can be regulated.

The three modes are sequentially changed from the initial normal state at the first stage to the output changeable state at the second stage and the traction control changeable state at the third stage each time the selecting switch 40 is short pressed one time. When the selecting switch 40 is short pressed from the traction control changeable state at the third stage, the initial normal state at the first stage returns. In addition, in a selected state at the second stage or at the third stage, when a predetermined time elapses in a state where any of the selecting switch 40 and the regulating switches 41 and 42 is not pressed, the state at the first stage is automatically returned.

In addition, in the embodiment, in addition to the three modes, a system menu changeable state can be selected, as shown at the lowest stage. When the selecting switch 40 is long pressed one time from the initial normal state, the system menu changeable state is displayed. When the selecting switch 40 is further long pressed, the initial normal state returns. Further, in the system menu changeable state, when a predetermined time elapses in a state where any of the selecting switch 40 and the regulating switches 41 and 42 is not pressed, the state at the first stage is automatically returned.

Next, the regulation or the changing operation of each of the controlled steps such as control amount by the forward sequence regulating switch 41 and the reverse sequence regulating switch 42 in a regulatable state will be described with reference to FIGS. 6 and 7.

[The Changing Operation in the Initial Normal State]

In the initial normal state shown at the first stage in FIG. 6, modes irrelevant to driving feeling can be regulated.

For instance, for the display of the fuel consumption in first display region S1, each time the forward sequence regulating switch 41 is short pressed, the display of the instant fuel consumption is sequentially changed to the display of the average fuel consumption, the travelable distance, the battery voltage, and the outside temperature, and when the forward sequence regulating switch 41 is further short pressed from the outside temperature display state, the display of the instant fuel consumption returns.

In addition, the forward sequence regulating switch 41 is long pressed in a state where first display region S1 is set to the average fuel consumption, so that the display of the average fuel consumption is reset to "0". Thereafter, the reset average fuel consumption is displayed.

For the display of the travel distance in fifth display region S5, each time the reverse sequence regulating switch 42 is short pressed one time, the odometer (ODO) display showing the total travel distance which cannot be reset is sequentially changed to the display of trip A and the display of trip B which indicate the resetable travel distance in any section. The reverse sequence regulating switch 42 is further short pressed from the display of trip B to return to the odometer display.

In addition, when fifth display region S5 is set to the display of trip A or trip B, the reverse sequence regulating switch 42 is long pressed to reset the travel distance display to "0", and then, the reset average fuel consumption is displayed.

[The Control Amount Regulating Operation in the Output Changeable State]

When the selecting switch 40 is short pressed one time from the initial normal state, the display is changed to the output changeable state at the second stage. In the output changeable state, the display of sixth display region S6 is flashed in the panel display section 35. That is, the state changed to the output changeable screen is shown to the driver.

In the changeable state at the second stage, when the current step indicates the full power, "F" is displayed. When the reverse sequence regulating switch 42 is short pressed from the full power step, the reverse sequence regulating signal is transmitted from the 3 channel switch mechanism 25 via the meter unit 29 to the ECU 50 in FIG. 5. Further, a control signal is transmitted from the ECU 50 to the panel display section 35, the injector 58, and the electronic throttle 59. With this, the output display of sixth display region S6 of the panel display section 35 is changed from "F" to "L", a fuel injection amount and an intake amount are controlled, and the output state of the engine is changed to the low power state.

Even when the reverse sequence regulating switch 42 is short pressed from the low power state, the low power state is not changed, and the output display of sixth display region S6 of the panel display section 35 is maintained in "L".

On the other hand, when the forward sequence regulating switch 41 is short pressed in the low power state, the forward sequence regulating signal is transmitted from the switch mechanism 25 via the meter unit 29 to the ECU 50 in FIG. 5. Further, a control signal is transmitted from the ECU 50 to the panel display section 35, the injector 58, and the electronic throttle 59. With this, a fuel injection amount and an intake amount are regulated to change the output state of the engine to the full power state, and the output display of sixth display region S6 of the panel display section 35 is changed from "L" to "F".

Even when the forward sequence regulating switch 41 is short pressed from the full power state of the engine, the full power state is not changed, and the output display of sixth display region S6 of the panel display unit 35 is maintained in the state of "F".

[The Regulating Operation in the Traction Control Changeable State]

The selecting switch 40 is further short pressed from the output changeable state, the display is changed to the traction control changeable state at the third stage. In the traction control changeable state, the display of seventh display region S7 of the panel display section 35 is flashed. That is, the state changed to the traction control changing screen is shown to the driver.

In this state, when the forward sequence regulating switch 41 is short pressed, the forward sequence regulating signal is transmitted from the switch mechanism 25 via the meter unit 29 to the ECU 50 in FIG. 5. Further, a control signal is transmitted from the ECU 50 to the panel display section 35 of the meter unit 29, the injector 58, and the electronic throttle 59. With this, the traction control performance display of seventh display region S7 of the panel display section 35 is changed from the current step to the high performance side one step higher, a fuel injection amount and an intake amount (further, ignition period) are regulated, and the traction control performance is changed to the high performance side one step higher.

That is, the traction control performance which is currently in the "OFF" state is changed into the "1" state, one step higher, by short pressing the forward sequence regulating switch 41 one time. In addition, the traction control performance which is currently in the "1" state is changed into the "2" state, one step higher, by short pressing the forward sequence regulating switch 41 one time. Further, the traction control performance which is currently in the "2" state is changed into the "3" state, one step higher. However, the traction control performance which is currently in the "3" state is maintained in the "3" state even by short pressing the forward sequence regulating switch 41.

In the traction control changeable state, when the reverse sequence regulating switch 42 is short pressed, the reverse sequence regulating signal is transmitted from the switch mechanism 25 via the meter unit 29 to the ECU 50 in FIG. 5. Further, a control signal is transmitted from the ECU 50 to the panel display section 35 of the meter unit 29, the injector 58, and the electronic throttle 59. With this, the traction control performance display of seventh display region S7 of the panel display section 35 is changed from the current step to the low performance side one step lower, a fuel injection amount and an intake amount (further, ignition period) are controlled, and the traction control performance is changed to the low performance side one step lower.

That is, the traction control performance which is currently in the "3" state is changed into the "2" state, one step lower, by short pressing the reverse sequence regulating switch 42 one time. In addition, the traction control performance which is currently in the "2" state is changed into the "1" state, one step lower, by short pressing the reverse sequence regulating switch 42 one time. Further, the traction control performance which is currently in the "1" state is changed into the "OFF" state, one step lower, by short pressing the reverse sequence regulating switch 42 one time. However, the traction control performance which is currently in the "OFF" state is maintained in the "OFF" state even by short pressing the reverse sequence regulating switch 42.

[The Selecting Operation to the Initial Normal State]

When the selecting switch 40 is short pressed in the traction control changeable state, the panel display section 35 is returned to the initial normal state and the initial normal screen.

In this embodiment, as shown in FIG. 6, when the selecting switch 40 is long pressed from the initial normal state, the panel display section 35 is brought into the system menu changeable state. In the system menu changeable state, the forward sequence regulating switch 41 or the reverse sequence regulating switch 42 is short pressed or is long pressed, so that the display of various system menus can be changed. For instance, the used language in the panel display section 35 can be changed from English to German or other languages, the brightness or display color of the panel display section can be changed, and the clock display form can be changed.

Further, in this embodiment, in the output changeable state at the second stage and the traction control changeable state at the third stage in FIG. 6, as described above, unless the regulating switch operation is performed for a predetermined time (e.g., 5 seconds), the panel display section 35 is returned to the initial normal screen in the initial normal state.

Effects of the Embodiment (1) As shown in FIGS. 2 and 3, the 3 channel switch mechanism 25 having the selecting switch 40, the forward sequence regulating switch 41, and the reverse sequence regulating switch 42 is arranged near the left grip 15. The mode to be regulated, that is, the output mode or the traction control performance mode, is selected by the selecting switch 40, and then, in the selected driving mode, the output or the traction control performance is regulated by the forward sequence regulating switch 41 or the reverse sequence regulating switch 42. With this, each of the regulating switches can be shared among the respective modes. Therefore, it is unnecessary to provide each of the regulating switches in each of the driving modes, the number of components for switches can be reduced, and the switches arranging space can be compact. In addition, the driver (rider) who grips the left grip 15 can easily perform the changing operation. Also, aside from the blinker switch 22, the horn switch 23, and the hazard switch 24, the 3 channel switch mechanism 25 for driving mode changing regulation is provided. Therefore, the switch operation can be easily performed.

(2) The driver can perform the selecting operation by the selecting switch 40 and the regulating operation of each of the controlled steps by the regulating switches 41 and 42 during driving. With this, the driver can drive the vehicle while actually feeling the change of each of the controlled steps such as control amount.

(3) The 3 channel switch mechanism 25 is arranged near the left grip 15 on the opposite side (the left side) of the right throttle grip 16. With this, the 3 channel switch mechanism 25 is unlikely to interfere with the throttle operation.

(4) In the output changeable state shown at the second stage in FIG. 6, even when the forward sequence regulating signal (amount increasing signal) is continuously inputted from the forward sequence regulating switch 41, the full power state at the maximum is maintained, and even when the reverse sequence regulating signal (amount decreasing signal) is continuously inputted from the reverse sequence regulating switch 42, the low power state at the minimum is maintained. With this, the driving state can be prevented from being changed to the tendency against the intension of the driver. That is, in the full power state, even when the driver short presses the forward sequence regulating switch 41 to increase the power without identifying the current outputted step, the full power state is not changed to the low power state.

(5) Like the output control, for the control of the traction control performance, the traction control performance which is in the maximum value "3" state is maintained in the maximum value "3" state even when the forward sequence regulating signal is continuously inputted from the forward sequence regulating switch 41, and the traction control performance which is in the "OFF" state is maintained in the "OFF" state even when the reverse sequence regulating signal is continuously inputted from the reverse sequence regulating switch 42. With this, the traction control performance can be prevented from being changed into the tendency against the intention of the driver. That is, with the traction control performance having the maximum value "3", when the driver short presses the forward sequence regulating switch 41 to increase the traction control performance without identifying the step of the traction control performance, the maximum value "3" is not changed to "OFF".

(6) For the regulation of each of the controlled steps such as control amount, the forward sequence regulating switch 41 and the reverse sequence regulating switch 42 are separately provided. With this, the driver can regulate each of the controlled steps along his/her intension without noting the meter screen.

(7) The driving mode and the controlled steps such as control amount to be regulated are displayed in the predetermined region of the panel display section 35, with the switch operation of the 3 channel switch mechanism 25. With this, the driver can regulate the driving mode and the controlled step thereof with confirmation. For instance, in the output control, the display of sixth display region S6 is flashed, and the numerical value changed is then displayed. In addition, in the control of the traction control performance, seventh display region S7 is flashed, and the numerical value changed is then displayed.

(8) In the initial normal state in which the selection signal from the selecting switch 40 is not inputted, even when the regulating switches 41 and 42 are operated, the driving mode is not changed. With this, any false operations can be prevented. In addition, the number of components can be reduced.

(9) When the switch non-operated state is continued for a predetermined time after the changing to the desired mode by the selecting switch 40, the initial normal state returns. With this, the pressing of the selecting switch 40 can be prevented from being forgotten. Therefore, the driving state can be prevented from being undesirably changed.

(10) In the initial normal state, the changing operation of first display region S1 (fuel consumption display) arranged in the upper section of the panel display section 35 in FIG. 7 is performed by the forward sequence regulating switch 41 arranged on the upper side of the selecting switch 40 in FIG. 4. On the other hand, the changing operation of fifth display region S5 (travel distance) arranged on the lower side in the middle section of the panel display section 35 is performed by the reverse sequence regulating switch 42 arranged on the lower side of the selecting switch 40 in FIG. 4. With this, the display region to be changed coincides with the upper and lower switches. Therefore, the operation can be easily performed.

(11) The 3 channel switch mechanism 25 is provided to be separated from the switches for driving the radiation devices for illumination and for notification to the outside of the vehicle, like the blinker switch 22 and the horn switch 22. With this, the notifying operation cannot be complicated, and the load to driving can be prevented from being increased.

(12) The 3 channel switch mechanism 25 is arranged away from the left grip 15 as compared with the switch for the radiation devices such as the blinker switch 21. That is, the blinker switch 21 which is frequently used during driving is arranged near the left grip 15. With this, the operation of the radiation devices such as the blinker switch 21 can be prevented from being obstructed by the 3 channel switch mechanism 25. Therefore, priority can be given to the operation of the radiation devices such as the blinker switch 21.

(13) The 3 channel switch mechanism 25 is arranged near the left grip 15. With this, the driver can operate the 3 channel switch mechanism 25 while gripping the left grip 15 during driving.

(14) The handlebar type vehicle has a less switches arrangeable region around the steering device. Therefore, the present invention is preferably applicable.

(15) The forward sequence regulating switch 41 which can increase the output and the workability of the traction control is arranged upward and forward of the reverse sequence regulating switch 42 which can decrease the output and the workability of the traction control. With this, the driver can easily assume an operated state by intuition.

(16) The selecting switch 40 is arranged between the forward sequence regulating switch 41 and the reverse sequence regulating switch 42. Therefore, the forward sequence regulating switch 41 and the reverse sequence regulating switch 42 can be separated at a fixed interval. With this, for instance, even when the driver puts on gloves, any false operations between the forward sequence regulating switch 41 and the reverse sequence regulating switch 42 can be prevented. That is, when the forward sequence regulating switch 41 is pressed, the reverse sequence regulating switch 42 can be prevented from being operated by mistake.

(17) Like FIG. 4, the selecting switch 40 is taller than the regulating switches 41 and 42, and is largely projected from the surface of the housing 44. With this, even when the selecting switch 40 is arranged between the forward sequence regulating switch 41 and the reverse sequence regulating switch 42, the regulating switches 41 and 42 can be prevented from being pressed by mistake when the selecting switch 40 is pressed.

(18) The forward sequence regulating switch 41, the reverse sequence regulating switch 42, and the selecting switch 40 are arranged along the peripheral direction of the grip shaft. Therefore, the size increase in the grip longitudinal direction can be prevented. In addition, the driver who grips the left grip 15 can easily operate each of the switches with his/her thumb.

(19) Like FIG. 4, the 3 channel switch mechanism 25 is arranged on the inclined surface 20*a* in the switch attaching member 20, which is inclined downward from the front side to the rear side. With this, the driver can easily identify the 3 channel switch mechanism 25.

Figure 8:
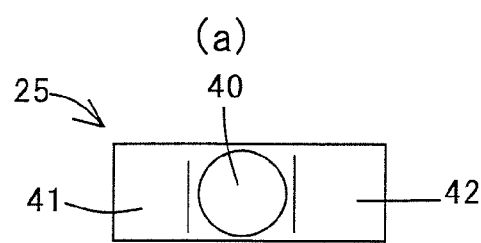
FIGS. 8A, 8B, and 8C are front views of modification examples of a 3 channel switch mechanism, respectively.
Figure 8:
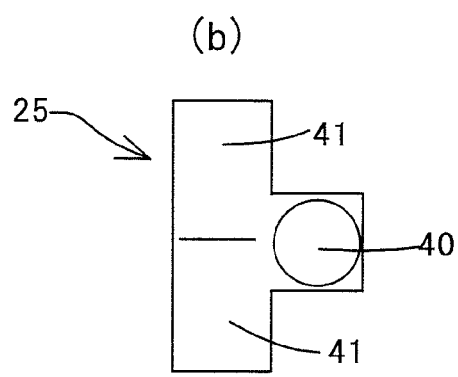
Figure 8:
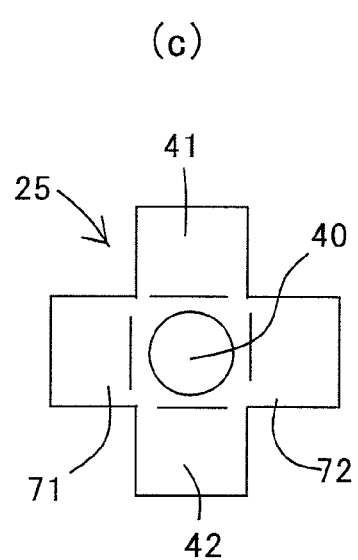

Other Embodiments (1) In the 3 channel switch mechanism 25 of the embodiment, the forward sequence regulating switch 41 and the reverse sequence regulating switch 42 are arranged on the upper and lower sides of the selecting switch 40. However, like FIG. 8A, the forward sequence regulating switch 41 and the reverse sequence regulating switch 42 can also be arranged on the left and right sides of the selecting switch 40. In addition, like FIG. 8B, the selecting switch 40, the forward sequence regulating switch 41, and the reverse sequence regulating switch 42 can also be arranged in a T-shape. Further, like FIG. 8C, in addition to the selecting switch 40, the forward sequence regulating switch 41, and the reverse sequence regulating switch 42, a pair of switches 71 and 72 for regulating different controlled steps can be provided, and the regulating switches 41, 42, 71, and 72 can also be arranged in a cross shape around the selecting switch 40.

(2) The 3 channel switch mechanism 25 is not limited to the shape in the embodiment, and may have other shapes which can operate each of the switches during driving. In addition, in the embodiment, the forward sequence regulating switch 41, the reverse sequence regulating switch 42, and the selecting switch 40 are arranged so as to be close to each other. However, the switches 40, 41, and 42 can also be arranged so as to be away from each other. For instance, one regulating switch may be arranged near the right throttle grip 16, and the other regulating switch may be arranged near the left grip 15. In addition, the switch operation may be performed by leg, not by hand.

(3) In the output changeable state shown at the second stage in FIG. 6, the full power and "F" which displays the full power can be the controlled step which does not limit the maximum output, and the low power and "L" which displays the low power can be the controlled step which limits the maximum output according to state so as not to provide excessive output.

(4) In the control of the 3 channel switch mechanism, the system menu changeable state as shown at the lowest stage in FIG. 6 may be changeable from the initial normal state only when the driving is stopped. In addition, the system menu changeable state may be arranged so that the initial normal state returns when the driving is started in the system menu changeable state.

Figure 9:
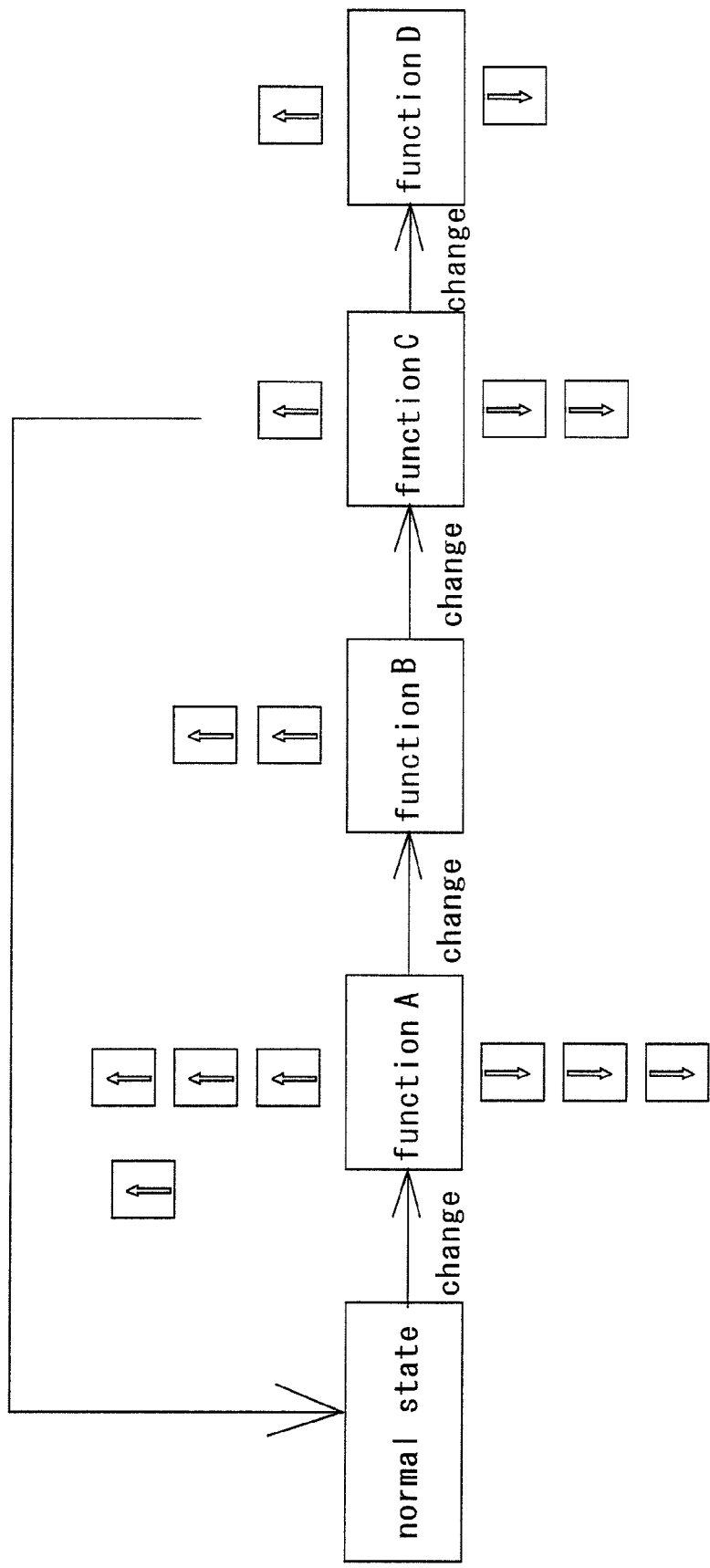
FIG. 9 is a block diagram showing the control flow of another controlling method according to the present invention.

(5) FIG. 9 shows a further control example. Unless the signal from the selecting switch or each of the regulating switches is inputted for a fixed time in a state where the driving mode to be regulated (e.g., function C) is selected, the finally operated controlled step is maintained to return to a state where the selection signal from the selecting switch is not inputted (normal state).

(6) In the control of the 3 channel switch mechanism, screen may be flashed when the display is changed in the initial normal state. In this way, the display form may be changed from that before the display change until a predetermined time elapses. With this, the operator can identify that the display is changed.

(7) In the control of the 3 channel switch mechanism, the display of the upper region of the upper and lower display regions can be changed by the regulating switch arranged on the upper side, and the display of the lower region of the upper and lower display regions can be changed by the regulating switch arranged on the lower side. Therefore, each of the regulating switches and the display change can be easily understood by intuition. The reset of the displayed result computed by each of the switches can be easily understood by intuition.

(8) In the embodiment, as the driving modes which influence driving feeling, the output mode and the traction control performance mode are set. However, in addition to these driving modes, the changing of the ABS unit, the changing of the height of the windshield 19, the changing of the performance of the electronic suspension, the changing of the amplification pressure of the power steering, and the changing of the limiting speed of the speed limiter can be selected and regulated by the 3 channel switch mechanism.

For instance, in the ABS unit, ON/OFF of the ABS operation or OFF, 1, 2, and 3 (the workability of the ABS) may be set by each of the regulating switches. In this case, like the traction control, the ABS operation can be easily performed with the step increase. That is, each time the forward sequence regulating switch 41 is short pressed, the step approaches "3", and each time the reverse sequence regulating switch 42 is short pressed, the step approaches "OFF".

In the windshield 19, each time the forward sequence regulating switch 41 is short pressed, the height of the windshield is increased (the angle thereof is increased), and each time the reverse sequence regulating switch 42 is short pressed, the height of the windshield is decreased.

In the electronically controlled suspension, for instance, in addition to the changing of ON/OFF, as the forward sequence regulating switch 41 is pressed, attenuation is decreased, and as the reverse sequence regulating switch 42 is pressed, attenuation is increased.

In the electronically controlled steering, for instance, in addition to the changing of ON/OFF, each time the forward sequence regulating switch 41 is short pressed, attenuation is decreased, and each time the reverse sequence regulating switch 42 is short pressed, attenuation is increased.

In the power steering, in addition to the changing of ON/OFF, each time the forward sequence regulating switch 41 is short pressed, the amplification amount of an operating force is increased.

In the limiting speed of the speed limiter, for instance, in addition to the changing of ON/OFF, each time the forward sequence regulating switch 41 is short pressed, the limiting speed is lowered.

In the automatic cruise, in addition to the changing of ON/OFF, each time the forward sequence regulating switch 41 is short pressed, the automatic cruise speed is lowered.

In the AFS, in addition to the changing of ON/OFF, each time the forward sequence regulating switch 41 is short pressed, the light distribution with respect to the bank is increased.

In addition, the workability of the engine brake and the idling rotation speed can be regulated.

Further, as the output control regulation, in addition to the eco-mode and the power level, a plurality of steps in a fuel and an FI map may be changed. In addition, the throttle response relation (the change in the opening of the throttle valve with respect to the change in the accelerator operation) can be changed, and the engine characteristic, character, and the output can be changed.

(8) The modes which do not influence driving feeling, including the changing of FM/AM of the audio system and the changing of ON/OFF of the grip heater, can be performed by operating the 3 channel switch mechanism 25.

(9) As the panel display section 35, the present invention is applicable to a configuration which performs digital display of the speed meter and the tachometer. In that case, for instance, a vehicle speed can be changed by each of the regulating switches between the display of kilometers/h and the display of miles/h.

(10) The present invention is applicable to the driving mode changing and the control amount regulation in various vehicles, such as a straddle type four-wheel vehicle and a working vehicle, in addition to the motorcycle. In addition, the present invention is applicable to an electric automobile. In that case, an electrically operated motor in place of the engine is output controlled.

(11) In the motorcycle in which driving modes, such as a rain mode, a normal mode, a circuit mode, and a motor mode, can change the engine characteristic, the 3 channel switch mechanism 25 is applicable to the changing of those modes.

(12) The modes selected by short pressing the selecting switch 40 and the screen display orders can be changed according to the preference of the user. In addition, logs at the time of selection and regulation can be stored in the ECU so as to be selected in a frequently selected mode order.

(13) When the forward sequence regulating switch 41 and the reverse sequence regulating switch 42 can be used for the initial setting of the meter (panel display section), the number of components can be reduced.

(14) The present invention is not limited to the configuration which has, as one 3 channel switch mechanism, the selecting switch, the forward sequence regulating switch, and the reverse sequence regulating switch, and the three switches can be distributably arranged. In addition, other existing switches can be used as the regulating switches.

(15) According to the driving state, the changing of each of the controlled steps such as control amount regulated by each of the regulating switches can be limited. For instance, the changing of each of the controlled steps is reserved during acceleration, during turning, or when an idling speed is high, and is then performed after the reservation conditions are ended.

(16) In addition, each of the controlled steps may be changeable in a constant speed state, and the changing thereof may be smaller in a non-constant speed state. Further, after any of the certain output suppressed states of the ABS, the traction control, and the maximum speed limit is released, the driving mode changing can be allowed. When the driving mode changing cannot be performed due to the suppressed state, this is understandably displayed in the display section (for instance, the flashing period is shortened).

(17) When the CAN communication system is not provided, the 3 channel switch mechanism 25 may be directly connected to the ECU.

(18) The up-down operation of the windshield, not the meter display changing, may be performed in the initial state. In addition, the changing of the audio system may be performed in the initial state. Further, any one of the output changing and the traction control changing, not the meter display changing, may be performed. Furthermore, any driving modes which are not frequently changed may be removed from the typical selection screen according to the preference of the user.

What is claimed is:

1. A control system for a vehicle including an engine and a handlebar provided with a throttle grip at a right end, the control system comprising:
a selecting switch having a plurality of driving modes to influence a driving feeling, the selecting switch selecting a desired driving mode from the plurality of driving modes during driving;
a forward sequence regulating switch changing a plurality of controlled steps in the driving mode selected by the selecting switch according to a predetermined normal order; and
a reverse sequence regulating switch changing the plurality of controlled steps in a reverse order of the predetermined normal order, wherein the selecting switch, the forward sequence regulating switch, and the reverse sequence regulating switch are arranged near a left grip of the handlebar, wherein the selecting of the driving mode, the changing of the plurality of controlled steps in the driving mode according to the predetermined normal order and the changing of the plurality of controlled steps in the reverse order are performed based on signals inputted from the selecting switch, the forward sequence regulating switch, and the reverse sequence regulating switch, wherein the selecting switch performs changing to the driving mode to be regulated according to the predetermined normal order each time a selection signal from the selecting switch is inputted, wherein the forward sequence regulating switch changes a current controlled step in the predetermined normal order each time a forward sequence regulating signal from the forward sequence regulating switch is inputted and, in a state where a forward sequence final step is reached, maintains the forward sequence final step even when the forward sequence regulating signal from the forward sequence regulating switch is inputted, and wherein the reverse sequence regulating switch changes the current controlled step in a reverse order of the predetermined normal order each time a reverse sequence regulating signal from the reverse sequence regulating switch is inputted and, in a state where a reverse sequence final step is reached, maintains the reverse sequence final step even when the reverse sequence regulating signal from the reverse sequence regulating switch is inputted.

2. The control system for the vehicle according to claim 1, wherein the predetermined normal order is an order in which a control amount of each of the controlled steps is sequentially increased, wherein the reverse order is an order in which the control amount of each of the controlled steps is sequentially decreased, wherein the forward sequence regulating switch is a switch which sequentially performs changing to a control amount increase side, and wherein the reverse sequence regulating switch is a switch which sequentially performs changing to a control amount decrease side.

3. The control system for the vehicle according to claim 1, wherein at least one of the selected driving mode and one of the controlled steps is displayed in a display section for mode confirmation according to a changing operation of the selecting switch or each of the forward sequence and reverse sequence regulating switches corresponding thereto.

4. The control system for the vehicle according to claim 1, wherein in an initial normal state in which the selection signal from the selecting switch is not inputted, a display other than the driving modes is changed according to the forward sequence regulating signal and the reverse sequence regulating signal inputted from each of the forward sequence and reverse sequence regulating switches.

5. The control system for the vehicle according to claim 1, wherein in a state where the driving mode to be regulated is selected, when the signal from the selecting switch or each of the regulating switches is not inputted for a fixed time, the regulating signal from the regulating switch is invalid until another selection signal from the selecting switch is inputted.

6. The control system for the vehicle according to claim 1, wherein in a state where the driving mode to be regulated is selected, when the signal from the selecting switch or each of the forward sequence and reverse sequence regulating switches is not inputted for a fixed time, a finally operated controlled step is maintained to return to a state where the selection signal from the selecting switch is not inputted.

7. The control system for the vehicle according to claim 1, wherein the selecting switch can perform a selection of modes other than the driving modes, and wherein each of the forward sequence and reverse sequence regulating switches can change a plurality of controlled steps in the modes other than the driving modes, when the modes other than the driving modes are selected by the selecting switch.

8. The control system for the vehicle according to claim 1, wherein the control system is mounted on the vehicle having the handlebar, wherein the selecting switch, the forward sequence regulating switch, and the reverse sequence regulating switch are set to be separated from switches which control devices which generate light or sound for notification or illumination to an outside of the vehicle.

9. The control system for the vehicle according to claim 1, wherein the driving modes which influence the driving feeling include an output control of a driving force of the vehicle.

10. The control system for the vehicle according to claim 1, wherein the driving modes which influence the driving feeling are control modes of actuators, excluding actuators for an output control of the vehicle.

11. A handlebar type vehicle comprising the control system for the vehicle according to claim 1.

12. The control system for the vehicle according to claim 1, wherein the driving modes which influence the driving feeling include a traction control performance mode.

13. The control system for the vehicle according to claim 1, wherein the driving modes which influence the driving feeling include any one of a fuel map, a throttle response relation, an engine characteristic or character, a setting of a full power, a setting of a lower power, an output characteristic given priority to a fuel consumption, and a running mode of the vehicle.

14. The control system for the vehicle according to claim 1, wherein the driving modes which influence the driving feeling include a limiting speed of a speed limiter or a limiting speed of an automatic cruise.

15. The control system for the vehicle according to claim 1, wherein the driving modes which influence the driving feeling include any one of a performance of an anti-lock brake system (ABS) unit, a height of a windshield, a performance of an electronic suspension, and an amplification pressure of a power steering.

16. A controlling method for controlling a vehicle including an engine and a handlebar provided with a throttle grip at a right end, the controlling method comprising:

selecting, via a selecting switch having a plurality of driving modes to influence a driving feeling, a desired driving mode from the plurality of driving modes during driving;

changing, via a forward sequence regulating switch, a plurality of controlled steps in the driving mode selected by said selecting according to a predetermined normal order; and changing, via a reverse sequence regulating switch, the plurality of controlled steps in a reverse order of the predetermined normal order, wherein the selecting switch, the forward sequence regulating switch, and the reverse sequence regulating switch are arranged near a left grip of the handlebar, wherein said selecting of the desired driving mode, said changing of the plurality of controlled steps in the driving mode and said changing of the plurality of controlled steps in the reverse order are performed based on signals inputted from the selecting switch, the forward sequence regulating switch, and the reverse sequence regulating switch, wherein said selecting of the desired driving mode changes the driving mode to be regulated according to the predetermined normal order each time a selection signal from the selecting switch is inputted, wherein said changing of the plurality of controlled steps in the driving mode according to the predetermined normal order changes a current controlled step in the predetermined normal order each time a forward sequence regulating signal from the forward sequence regulating switch is inputted, wherein, in a state where a forward sequence final step is reached, said changing of the plurality of controlled steps in the driving mode according to the predetermined normal order maintains the forward sequence final step even when the forward sequence regulating signal from the forward sequence regulating switch is inputted, wherein said changing of the plurality of controlled steps in the reverse order changes the current controlled step in a reverse order of the predetermined normal order each time a reverse sequence regulating signal from the reverse sequence regulating switch is inputted, and wherein, in a state where a reverse sequence final step is reached, said changing of the plurality of controlled steps in the reverse order maintains the reverse sequence final step even when the reverse sequence regulating signal from the reverse sequence regulating switch is inputted.

17. A control system for a vehicle comprising:

a selecting switch having a plurality of driving modes to influence a driving feeling, the selecting switch selecting a desired driving mode from the plurality of driving modes during driving;

a forward sequence regulating switch changing a plurality of controlled steps in the driving mode selected by the selecting switch according to a predetermined normal order; and a reverse sequence regulating switch changing the plurality of controlled steps in a reverse order of the predetermined normal order, wherein the selection of the driving mode, the changing of the plurality of controlled steps in the driving mode according to the predetermined normal order and the changing of the plurality of controlled steps in the reverse order are performed based on signals inputted from the selecting switch, the forward sequence regulating switch, and the reverse sequence regulating switch, wherein the selecting switch performs changing to the driving mode to be regulated according to the predetermined normal order each time a selection signal from the selecting switch is inputted, wherein the forward sequence regulating switch changes a current controlled step in the predetermined normal order each time a forward sequence regulating signal from the forward sequence regulating switch is inputted and, in a state where a forward sequence final step is reached, maintains the forward sequence final step even when the forward sequence regulating signal from the forward sequence regulating switch is inputted, wherein the reverse sequence regulating switch changes the current controlled step in a reverse order of the predetermined normal order each time a reverse sequence regulating signal from the reverse sequence regulating switch is inputted and, in a state where a reverse sequence final step is reached, maintains the reverse sequence final step even when the reverse sequence regulating signal from the reverse sequence regulating switch is inputted, and wherein the driving modes which influence the driving feeling include a control mode of actuators for controlling an engine.

18. The control system for the vehicle according to claim 17, wherein the actuators for controlling the engine include any one of a fuel injector, an electronic throttle and an ignition device.

* * * * *